UNITED STATES PATENT OFFICE.

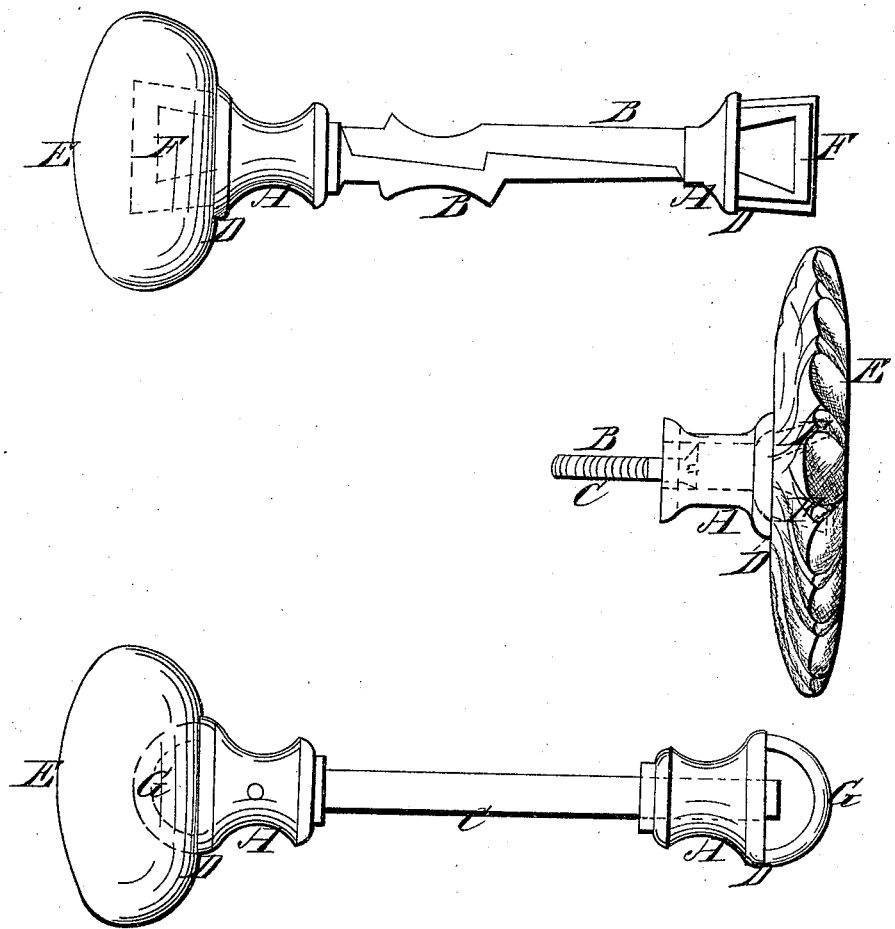
Livingston, Roggen, Adams & Phillips,
Knob,
Nº 4,883.    Patented Dec. 10, 1846.

LAURESTON R. LIVINGSTON, JOHN J. ROGGEN, CALVIN ADAMS, WILLIAM PHILLIPS, AND ROBERT PHILLIPS, OF PITTSBURGH, PENNSYLVANIA.

ATTACHING DOOR-KNOBS TO THEIR COLLARS.

Specification of Letters Patent No. 4,883, dated December 10, 1846.

*To all whom it may concern:*

Be it known that we, LAURESTON R. LIVINGSTON, JOHN JAY ROGGEN, and CALVIN ADAMS, iron-founders, and WILLIAM PHILLIPS and ROBERT PHILLIPS, glass manufacturers, all of the city of Pittsburgh, county of Allegheny, and State of Pennsylvania, have invented a new and useful Improvement in the Mode of Constructing Knobs for Doors, Drawers, Curtain-Pins, &c.; and we do hereby declare that the following is a full and exact description.

The nature of our invention consists in giving such a form to a metallic neck and collar, as will support a head of glass of any desired shape, and of forming projections upon the face of the collar, to extend into the head while the glass is in a fused state; by means of the projections the glass head and the metallic neck are fastened together; the strain given by the hand in opening or shutting doors, or in screwing the shank into drawers, window frames, &c., is more equally divided in the glass head, and the glass is less liable to be broken, or to become loose.

To enable others skilled in the art, to make and use our invention, we will proceed to describe its construction and operation.

By reference to the drawings accompanying this specification, and forming a part, the distinctive features will be made manifest.

We form a metallic neck (A) around the outside end of the shank pieces (B, B) forming the pair, or the spindle (C,) the neck extends out about one inch more or less from the door or latch to suit convenience or fancy and the neck is either cast solid with, or upon the shank pieces (B, B,) or made with an orifice through the center to be afterward fastened upon the spindle (C); on the outward end of the neck we form a collar (D,) designed to bear against and support a glass head (E,); we also form projections (F, F,) upon the face of the collar or wire loops (G, G,) firmly fastened into the collar, and extending from the collar about three-eighths of an inch; these loops or projections, are made to enter into the glass head while the glass is in a fused state, and serve as anchors to hold the neck and head together.

We make the neck, collar, and projections of cast iron, brass or any other suitable material and of various shapes and sizes, to suit the purpose, for which it is designed viz for outside doors, it will require a larger size than for inside and for drawers, and curtain pins a form of peculiar shape. The form of the glass head is made in a mold, of any desired shape, previously prepared to hold the neck of the knob which is heated red hot to prevent its breaking the glass by expansion from the heat of the fused glass; the pressure given to form the shape of the glass head, forces the projection into the glass, thereby uniting the metallic neck, and glass head firmly together. It will be seen that the metallic collar serves to strengthen the glass by bearing up against the surface of the knob also that if the projection which extends into the glass is made in two parts so as to allow the glass to unite in the center the strain in the glass head will be divided, and less liable to break, than if a square headed pin or nut passed into the center of the glass.

The several kinds of glass door knobs now in use or on sale are either deficient in strength or too expensive for general use. Those knobs which have the nut or screw pin cast firmly into the center of the glass the neck being made of glass are liable to be easily broken, because the strain is often all on one side, the neck being the smallest part, consequently the weakest at that point where most strength is required; and those which are connected to a washer or collar, by means of fused metal, or cement running upon the outside have a clumsy appearance, and often work loose by using. While those which are connected to the spindle, neck, and collar, by means of fused metal run into the inside of the head, though neater in appearance, the connection is attended with extra expense, and are also liable to become loose by use.

We do not claim to be the inventors of a glass headed knob, nor of the method of inserting a metallic screw, nut, or pin, into fused glass, the same having been made and done to our knowledge before our application.

What we do claim and for which we now ask Letters Patent, is—

The mode of combining a metallic neck, and collar, with a glass head, by means of wire loops or metallic projections, united with the collar and extending into a glass head, while the glass is in a fused state as herein described.

L. R. LIVINGSTON.
J. J. ROGGEN.
CALVIN ADAMS.
WM. PHILLIPS.
R. PHILLIPS.

Witnesses:
ALEX MILLAR,
JACOB ROGGHE.